United States Patent
Forster (10) Patent No.: US 9,378,451 B2
(45) Date of Patent: Jun. 28, 2016

(54) RFID LABELS WITH DIGITALLY PRINTED INDICIA FOR MATCHING MERCHANDISE APPEARANCE CHARACTERISTICS

(71) Applicant: Avery Dennison Retail Information Services, LLC, Mentor, OH (US)

(72) Inventor: Ian James Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 42 days.

(21) Appl. No.: 13/966,831

(22) Filed: Aug. 14, 2013

(65) Prior Publication Data

US 2015/0048170 A1 Feb. 19, 2015

(51) Int. Cl.
*G06K 19/06* (2006.01)
*G06K 19/077* (2006.01)
*G09F 3/00* (2006.01)

(52) U.S. Cl.
CPC .......... *G06K 19/0776* (2013.01); *G09F 3/0297* (2013.01)

(58) Field of Classification Search
USPC ............... 235/494, 492, 488, 383; 340/572.7, 340/572.8
See application file for complete search history.

(56) References Cited

U.S. PATENT DOCUMENTS

| 7,108,183 | B1* | 9/2006 | Cox, Jr. .................... 235/462.01 |
| 7,701,345 | B2* | 4/2010 | Weslake et al. ............ 340/572.1 |
| 2003/0141375 | A1* | 7/2003 | Lawandy ...................... 235/494 |
| 2004/0211510 | A1 | 10/2004 | Franko, Sr. |
| 2006/0055540 | A1* | 3/2006 | Lawrence et al. .......... 340/572.7 |
| 2009/0017269 | A1* | 1/2009 | Johnson ..................... 428/195.1 |
| 2010/0173041 | A1* | 7/2010 | Olivier .............................. 426/2 |
| 2013/0112751 | A1* | 5/2013 | Maurer et al. ................ 235/454 |

OTHER PUBLICATIONS

International Search Report and Written Opinion dated Nov. 19, 2014 for International Application No. PCT/US2014/051097 filed Aug. 14, 2014.

\* cited by examiner

*Primary Examiner* — Ahshik Kim
(74) *Attorney, Agent, or Firm* — Avery Dennison Retail Information Services, LLC (57) ABSTRACT

RFID labels blend with a branding color, a branding pattern or a branding color and pattern of an item of merchandise or packaging to which it is attached in order to provide inventory control and security functions, which are digitally printed onto a label substrate having an RFID inlay. When desired, the printed label has UV ink dots applied in a useful orientation and can provide a glowing code attribute to the label. Defined label shaping can be provided by digital cutting. Digital adhesive application can be included on the label substrate, which can be combined with digital cutting to provide for self-adhesion of the label, and the digital cutting and digital adhesive placement can be arranged so as to include dry tab characteristics to the label.

20 Claims, 5 Drawing Sheets

RFID LABELS WITH DIGITALLY PRINTED INDICIA FOR MATCHING MERCHANDISE APPEARANCE CHARACTERISTICS

BACKGROUND

1. Field of the Disclosure

The present subject matter relates to merchandise inventory control and/or security labels and/or tags. More particularly, the present subject matter relates to such labels and/or tags that have a radio frequency identification ("RFID") device such as an inlay, tag or label and that provide unobtrusive RFID capability for merchandise during some or all of the production, processing, warehousing and merchandising, and that is especially suitable for small-sized and expensive merchandise.

2. Description of Related Art

Devices incorporating RFID technology are widely used for a variety of different applications, including inventory control, tracking, guard and security systems. Such systems are well known in the retail industry, including in connection with clothing and merchandise inventory control and security from theft and other potential losses.

RFID devices may have a variety of integrated components, among them an RFID chip containing data such as an identification code for the type of product and even for the exact piece of goods associated with a unique identification code. Other components include an antenna electrically connected to the RFID chip, which is responsible for transmitting signals to and/or receiving signals from another RFID device, for example, an RFID reader system. The antenna and RFID chip are typically provided on a substrate such as plastic which can then be attached to an object or incorporated into another structure, such as a tag or label.

In one example, an RFID reader is associated with a point-of-sale location or check-out counter of a retail facility and detects the chip in a label or tag associated with an article, consumer goods or other piece or item of merchandise, which can include the register or sales price of that item. In another example, an RFID-readable label or tag is attached to a piece of merchandise in a retail facility, which labels or tags are scanned using an RFID reader to keep proper count of the product inventory and/or to be used as a security measure functioning as a so-called guard label or tag.

Ludwig et al. U.S. Patent Application Publication No. 2010/0245112 describes a multilayer flexible film body, taught to be for particular use as a label film or a packaging film. A decorative layer can include a sensor element for detecting an external activation signal such as an alternating field including the use of RF field senders, among others. The film body can be in the form of an RFID tag.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, an unobtrusive merchandise label, tag or the like comprises a substrate with a RFID chip and antenna connected thereto forming an RFID inlay and having digitally defined indicia printed thereon. The digitally defined indicia matches or is complementary to indicia or color of an item of merchandise, such as its packaging which will be adjacent to the label or tag, or the tag or label will be juxtaposed on the packaging, thereby substantially minimizing or even as much as eliminating appearance differences to the unaided eye between the RFID label or tag and merchandise item and packaging indicia adjacent thereto.

In another aspect, an unobtrusive merchandise label or tag or the like comprises a substrate having a RFID chip connected to an antenna forming an RFID inlay, the antenna including a slot-loop hybrid antenna and digitally defined indicia printed thereon. The digitally defined indicia matches or compliments indicia or color of an item of merchandise or its packaging which is adjacent the RFID label or tag or upon which the RFID tag or label is juxtaposed on, thereby substantially minimizing or even as much as eliminating appearance differences to the unaided eye between the label or tag and merchandise item indicia adjacent thereto.

In a further aspect, an unobtrusive merchandise label, tag or the like comprises a substrate having a RFID chip connected to an antenna forming an RFID inlay, optionally including a slot-loop hybrid antenna and a digitally defined pattern and/or color printed thereon. The digitally defined pattern and/or color substantially matches or compliments the pattern and/or color of an item of merchandise or its packaging at locations adjacent the label or tag, or where the label or tag is juxtaposed on the packaging when assembled there onto, thereby minimizing or substantially eliminating, to the unaided eye, appearance differences between the RFID label or tag and the pattern and/or color of the merchandise item or its packaging adjacent to the assembled label or tag. The label or tag is digitally cut according to a predetermined perimeter that assists in the matching of the tag to the packaging. The cutting can help form a complimentary shape to the packaging or item of merchandise.

In an additional aspect, an unobtrusive merchandise label, tag or the like comprises a RFID label or tag digitally enhanced by printing and applied to a substrate, with digitally defined indicia also printed there onto. The digitally defined indicia match or compliments indicia or packaging of an item of merchandise which is adjacent the RFID label or tag, thereby minimizing or substantially eliminating, to the unaided eye, appearance differences between the label or tag and the merchandise item, particularly its indicia adjacent to the label or tag when assembled onto the merchandise item.

In yet an added aspect, an unobtrusive merchandise label, tag or the like comprises a substrate with an RFID tag or label digitally printed there onto, with digitally defined indicia also printed there onto. The digitally defined indicia match indicia of an item of merchandise adjacent the label or tag, thereby minimizing or substantially eliminating, to the unaided eye, appearance differences between the RFID label or tag and the merchandise item or its packaging, particularly its indicia adjacent to the label or tag when assembled onto the merchandise item or packaging. The label or tag includes ultraviolet (UV) ink defining an 1D code or a 2D code to provide UV "illumination" to the item at the label or tag.

In an added embodiment, an unobtrusive merchandise label, tag or the like comprises a substrate with an RFID inlay digitally printed there onto, with digitally defined indicia also printed there onto. The digitally defined indicia match indicia of an item of merchandise or its packaging adjacent the label or tag, thereby minimizing or substantially eliminating, to the unaided eye, appearance differences between the label or tag and the merchandise item, particularly its indicia adjacent to the label or tag when assembled onto the merchandise item. The label or tag with digitally set indicia is digitally cut with a predetermined perimeter size and pattern in order to assist in said matching. Dry tag can be provided in connection with such labels, including use of a wet inlay having at least a partial coating of adhesive and dry inlay areas.

In a further aspect, an unobtrusive merchandise label, tag or the like comprises a substrate with an RFID inlay digitally printed there onto, with digitally defined indicia also printed there onto. The digitally defined indicia match indicia of an item of merchandise adjacent the label or tag, thereby minimizing or substantially eliminating, to the unaided eye, appearance differences between the label or tag and the merchandise item, particularly its indicia adjacent to the label or tag when assembled onto the merchandise item. The label further includes a digitally printed adhesive pattern generally following the perimeter shape of the label or tag.

In another aspect, an item of merchandise is provided with an unobtrusive RFID label or tag. The item or merchandise has indicia, such as a pattern and/or color or color combination, or merchandising indicia. The unobtrusive merchandise label, tag or the like matches such merchandising indicia or packaging at locations adjacent the designated location or locations for the merchandise label or tag. The item of merchandise has an RFID label or tag that better conforms to adjacent merchandise locations, including three-dimensional ("3D") surfaces, including curved surfaces, of the merchandising item, thereby minimizing interference with the product branding of the merchandise item.

In yet a further aspect, a method for unobtrusive RFID labeling is provided on an item of merchandise, typically relatively small and/or expensive items, displaying a pattern and/or color relevant to branding of the item. The method provides a label having an RFID inlay and digitally printing a pattern and/or color on the label substrate that substantially matches the pattern and/or color scheme of the merchandising item. Application of the printed label onto the item provides a label or tag that is not detrimental to the branding objectives for the merchandising item. A label blends with the displayed pattern and/or color scheme of the item of merchandise, whereby the label gives an unobtrusive appearance on the item of merchandise.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

The term label is used herein, or occasionally the term tag, in order to designate this type of "chameleon" RFID member, even though same may not be recognized by the unaided eye as anything other than a part of the merchandise item or its packaging. Thus, although the term label is used herein, it may not meet the connotation typically associated with a label, namely an area that is often intended to direct attention to itself. The labels disclosed herein provide RFID capabilities to items of merchandise in an unobtrusive and branding-friendly manner. By the approach disclosed herein, RFID capabilities are imparted to the merchandise item in a manner that can vary from item to item and with details that will vary according to specific indicia of the item of merchandise. Label, in addition to tag, may also include inlay or RFID device. Inlays can be incorporated into a tag or label by a converting process, or may be applied to a surface without any further converting steps required. RFID device includes a larger category of items such as straps, inlays, tags and labels.

The present disclosure is especially suitable for unobtrusive RFID tagging or labeling of relatively small and typically expensive items of merchandise. The present disclosure is especially suitable for items of merchandise of this type that exhibit an appearance that itself and/or through the associated packaging has branding or marketing objectives. Owners of such branding assets can be reluctant to potentially damage important branding strategy or degrade expensive packaging configurations in order to take advantage of RFID capabilities such as enhanced inventory control, security from theft and tampering, and other objectives that RFID technology can provide. This is not to say that the present disclosure is not suitable for items larger than these, including pre-printed cartons having pre-designated indicia, patterns, logos, branding specifics or complex visuals where minimal visual impact of the RFID tag or label is desirable, such as perhaps to make it more difficult for a shop lifter to locate and remove a RFID tag or label from an item of commerce. Nevertheless, most of the disclosure herein focuses on application of the present technology to small and expensive merchandise items for which branding continuity is especially important, such as electronics, perfume containers, cosmetic containers and packaging for jewelry and precious metal wares.

An aspect of many embodiments of this disclosure is the use of digital printing or imaging technology to create these RFID labels that can be especially small in size and precise in indicia, color and shape specifics to the extent they blend in with the environment of their intended use, such as that of small products or items of merchandise or the associated packaging of such items. This precision facilitates the ability to achieve the objective of blending in with the indicia, e.g. brand names, trade dress, or packaging such as patterns and color and texture of the intended branding environment. As used herein, "indicia" may refer collectively to alpha and numeric lettering as well as packaging attributes such as color, texture and the like. Generally speaking, one or more indicia of the intended environment on the item of merchandise are matched during preparation of the RFID label. The use of digital technology enhances the accuracy needed to achieve this result, which can include relatively low volumes of multiple versions of precision labels without being cost prohibitive. Representative digital technology includes the HP Indigo® digital printing press available from Hewlett Packard Company of Ness Ziona, Isreal and Xeikon® available from Xeikon, Nev. of The Netherlands.

Digital technology for these applications of the present disclosure can include the use of digital printers, digital variable printing, digitally controlled label cutting operations, computer controlled laser cutting, digitally variable printing and digital adhesive printing. The labels of the present invention better conform to curved surfaces and to other three-dimensional ("3D") aspects of the packaging or item of merchandise for which the label is intended. The present invention avoids the need to use what could be considered to be obtrusive labels, such as white labels with RFID capabilities that can be very undesirable from a branding viewpoint; instead, the labels "blend in" to the branding environment of the merchandise and may even be considered to be camouflaged with the surrounding packaging environment.

In an alternative, the RFID label can be overprinted with manufacturing information, such as ingredient, use or care instructions for the particular item. Thus, the RFID label does not take away from any available printing "landscape" which the manufacturer or distributor might otherwise utilize.

The present disclosure finds particular application in providing very small labels or tags for electronics, cosmetics, personal care goods and house wares for which the use of a printed barcode or other information, or even RFID capability for inventory, is very problematic as traditional RFID labels can distort the appearance of the package and take away from the branding effect. It may be difficult to position a typical prior art label, no matter how attractive, at a location that will not interfere with branding or marketing objectives or the labels may end up covering or concealing important manufacturing information, such as ingredients, use or care information. These are the types of products that can be benefitted most by the present disclosure, particularly including the use of digital technology to avoid costly production investment to set up short runs for desired labeling.

Figure 1:
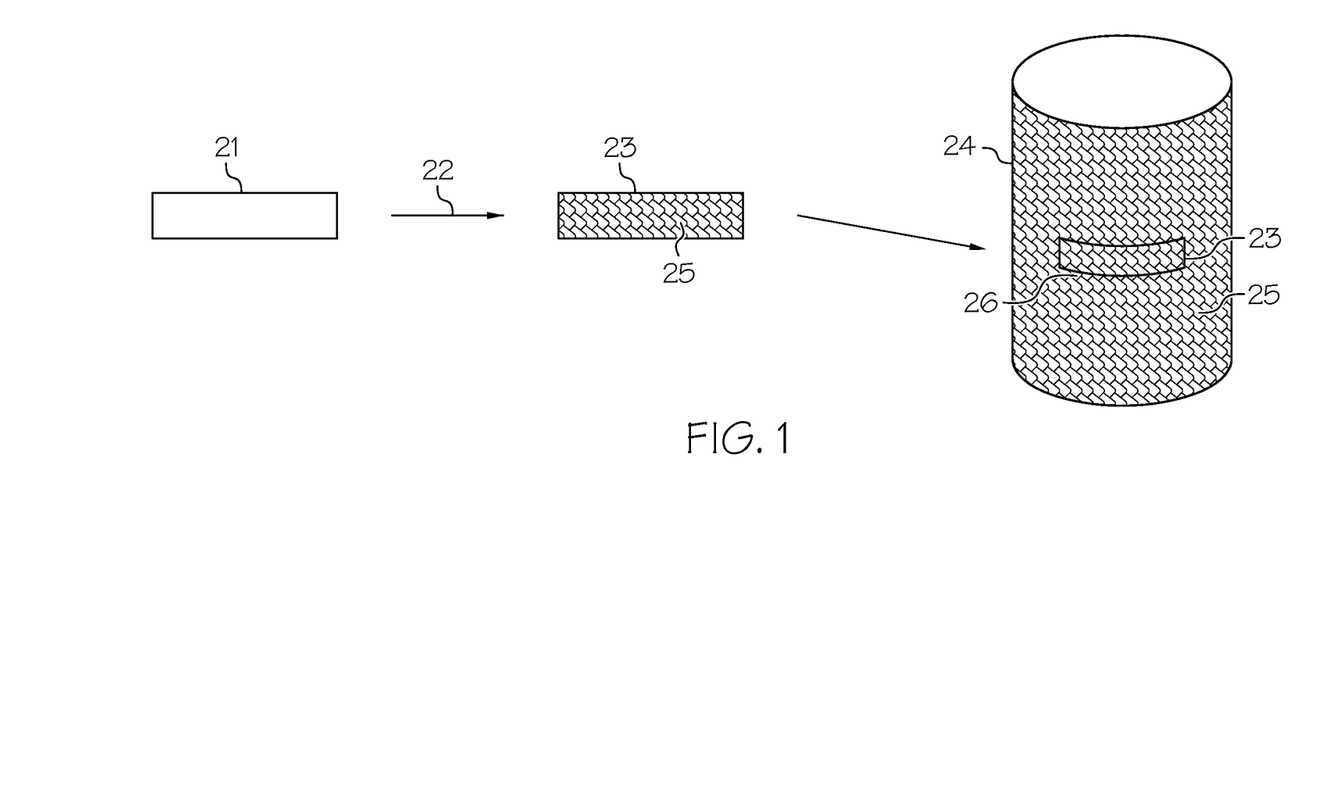
FIG. 1 is a schematic illustration including digital printing of a patterned and colored label matching those of a merchandise item and the RFID label applied to a merchandise item exhibiting the color and pattern.

FIG. 1 illustrates a digitally printed label matching or complimenting an item of merchandise to which it is intended to be affixed such as through the use of a pressure sensitive adhesive, frangible bond, fastener or other means suitable for attaching a RFID device to a surface. Exemplary RFID inlays, labels and tags are available from Avery Dennison Retail Information Services, LLC, of Westborough, Mass. or Avery Dennison RFID Company of Clinton, S.C.

A RFID label 21 is subjected to digital printing at 22 by printing techniques generally known in the art, such as through a sheet fed or roll to roll digital imaging press, resulting in a digitally printed RFID label 23. A merchandise item 24 displays a particular branding pattern 25, the particular pattern shown in FIG. 1 being for illustrative purposes only. It should be understood that the digital pattern may include trade dress, trade names, trademarks, alpha or numeric characters, as well as aesthetic features such as designs, themes, patterns or the like in or on the packaging itself. In addition, this merchandise item and branding pattern can be associated with a particular color or color scheme and/or with a particular texture to provide certain indicia. Typically, these indicia have branding importance to the manufacturer and/or marketer of the merchandise item. The illustrated merchandise item 24 is shown in FIG. 1 with outlines 26; however, these outlines are provided merely to illustrate the location of the digitally printed label. It will be appreciated that an important consideration of the present disclosure is to minimize, substantially reduce or even totally eliminate any type of indication of demarcation between the digitally printed RFID label and the merchandise item once the RFID label 23 is secured to the item 24.

Figure 2:
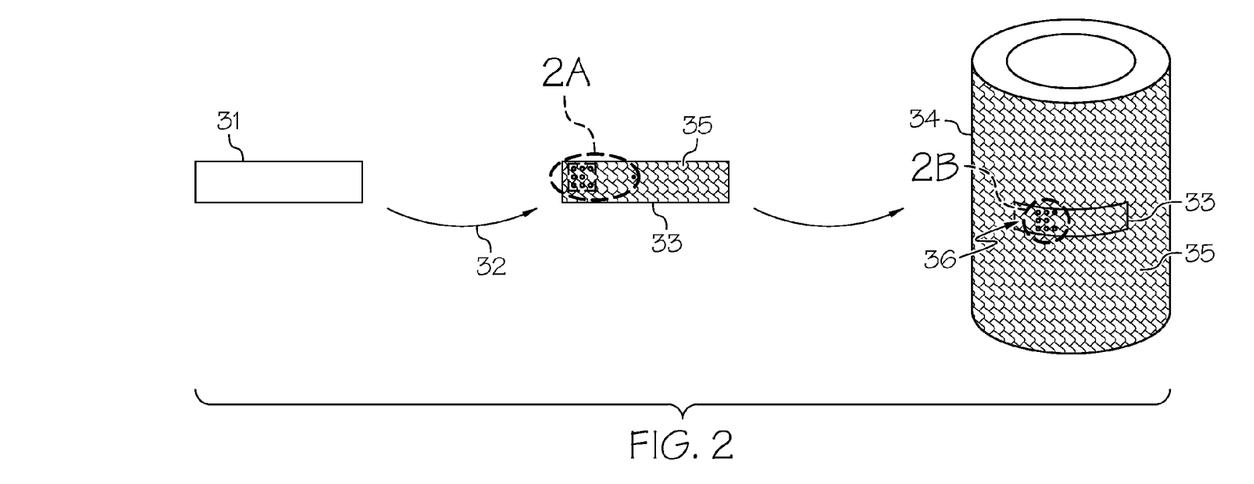
FIG. 2 is a schematic illustration along the lines of FIG. 1 with the added feature of using UV ink dots to provide a "glowing" or detectable code for the applied RFID label.
Figure 2A:
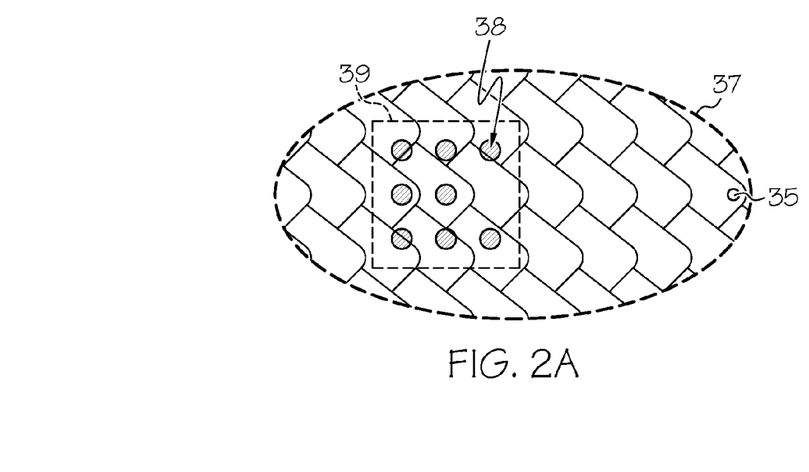
Figure 2B:
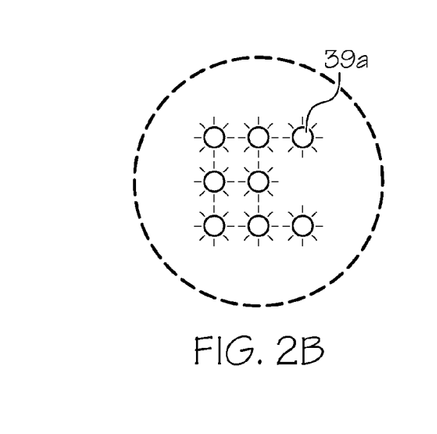

FIG. 2 presents a variation on the basic concept of FIG. 1. Here an RFID label 31 undergoes digital printing 32 in preparation of a digitally printed label for fixing to a merchandise item 34 having a branding pattern 35. The RFID label 31 is shown juxtaposed on an exterior face of the merchandise item 34 or on the outfacing packaging wall. Outlines 36 are shown in FIG. 2 in order to illustrate the location of the digitally printed label on the merchandise item 34 and do not designate a visible line of demarcation between them. With the approach illustrated in FIG. 2, the digital printing adds a feature of imparting a "glowing" code to the digitally printed label 33. Exploded detail 37 illustrates the indicia printed onto the RFID label during digital printing 32. Also printed are ultraviolet ("UV") ink deposits 38, which can take the form of UV ink dots. Phantom area 39 delineates the location within which the UV ink deposits 38 are positioned during printing. Other inks or security features may be used in lieu of UV inks in order to provide a similar highlighting or indicator effect for the RFID label, such as fluorescent ink, rare earth element inks that can be detected by a special scanner or the like.

It will be appreciated that the printing of the branding pattern 35 and UV ink deposits 38 can be carried out during a single printing, or substantially simultaneously or sequentially. Alternatively, the branding 35 can first be digitally printed onto the RFID label 31 and the UV ink deposits 38 shown in the phantom area 39 digitally printed in a subsequent separate step. It is also contemplated that reversal of any such separate printing steps can also be accomplished, in which case the UV ink deposits 38 are laid down first, followed by laying down of the branding pattern 35.

With the digitally printed label 33 applied to the merchandise item 34, the UV ink deposits provide a glowing code, designated at 39a. For more particular reference to the glowing code, this provides an additional code or readable area on the merchandise item 34. Examples of UV ink include UV Cured Gravure Ink, No. 982-64, from DAW Ink. These UV ink deposits or dots can have a 1D or a 2D code embedded into the digitally printed label 33. Details of UV inks are found in U.S. Pat. No. 7,332,205, incorporated herein by reference. Details of glowing code components 39a that function as an optical brightener that is UV detectable are found for example in U.S. Patent Application Publication No. 2013/0055555, incorporated herein by reference. These inks or dots can function as registration marks that can be detected or be "visible" to systems such as machine vision scanning. It will be appreciated that, by operation of printing of the UV ink deposits 38, the glowing code registration marks are patterned by the printer, which pattern is maintained for detection. Such glowing code locations can be visible when the digitally printed label includes adhesive for securing the label to the merchandise item.

Figure 3:
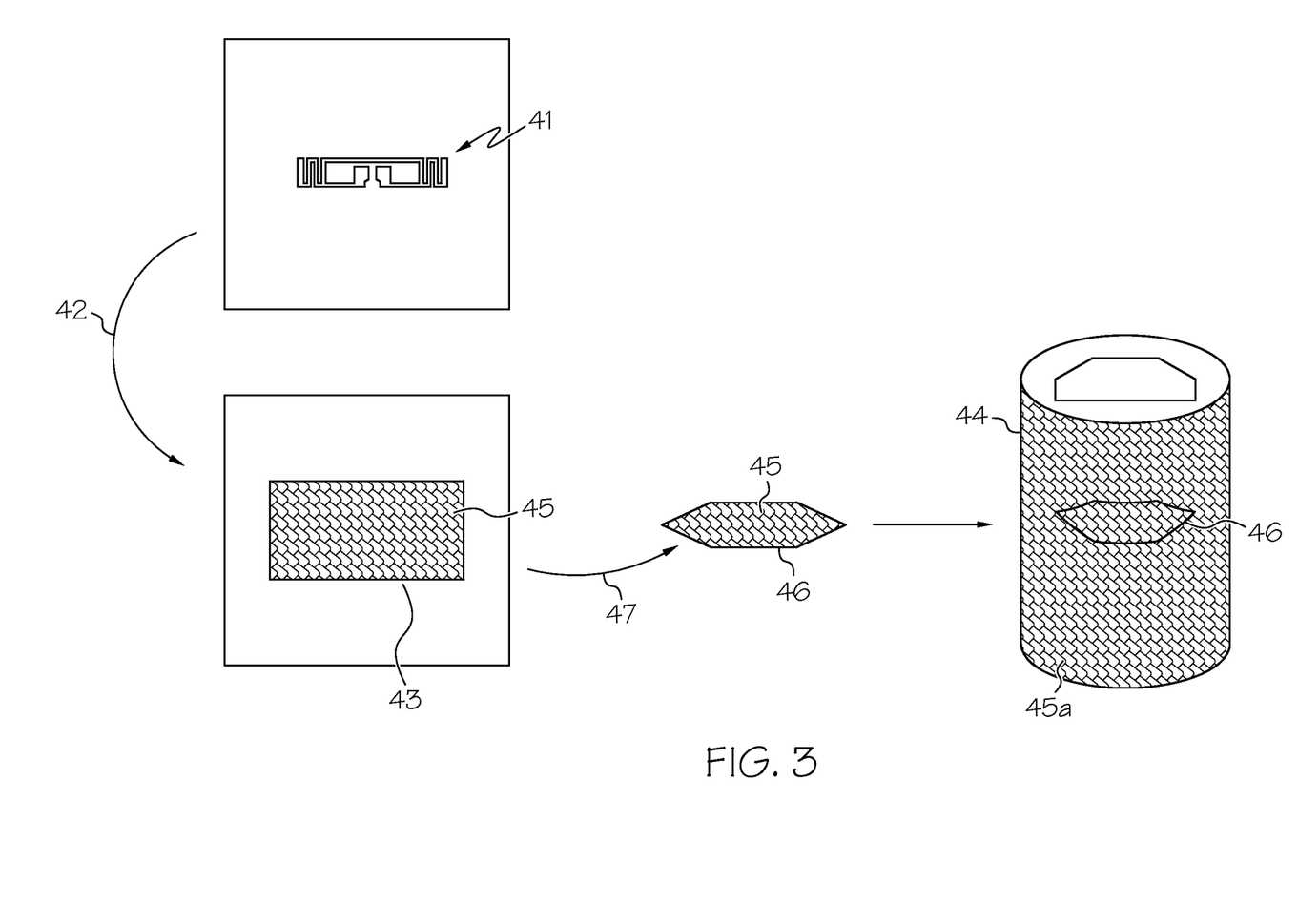
FIG. 3 is a schematic illustration including digital printing of indicia on a sheet with an RFID inlay, and digitally cutting same prior to application to a pattern matching that of a merchandise item.

An RFID inlay 41 provided on a printable sheet for use for example in a sheet fed digital printer is illustrated in FIG. 3. The sheet will undergo digital printing 42 to form a digitally printed pre-label 43. Pre-label 43 has the RFID inlay 41 within the pre-label that includes branding pattern 45 that has substantially the same shape, sizing, color and spacing as a branding pattern 45a of a merchandise item 44.

At this stage in this embodiment, digital cutting is performed in order to prepare a defined shape label 46 as seen in FIG. 3. With this digital cutting 47, the resulting digital cut defined shape label 46 allows the label shape to be precisely determined in order to conform to the surface of the merchandise item 44 or to fit within a particular area of the packaging design or pattern. This includes a digital label cut so the shape can conform precisely to a three-dimensional surface shape or topography of the merchandise item. An important advantageous result is to facilitate better adhesion of the defined shape RFID label 46 onto the merchandise item, thereby contributing to the "invisibility" or camouflage of the label to the unaided eye.

Figure 4:
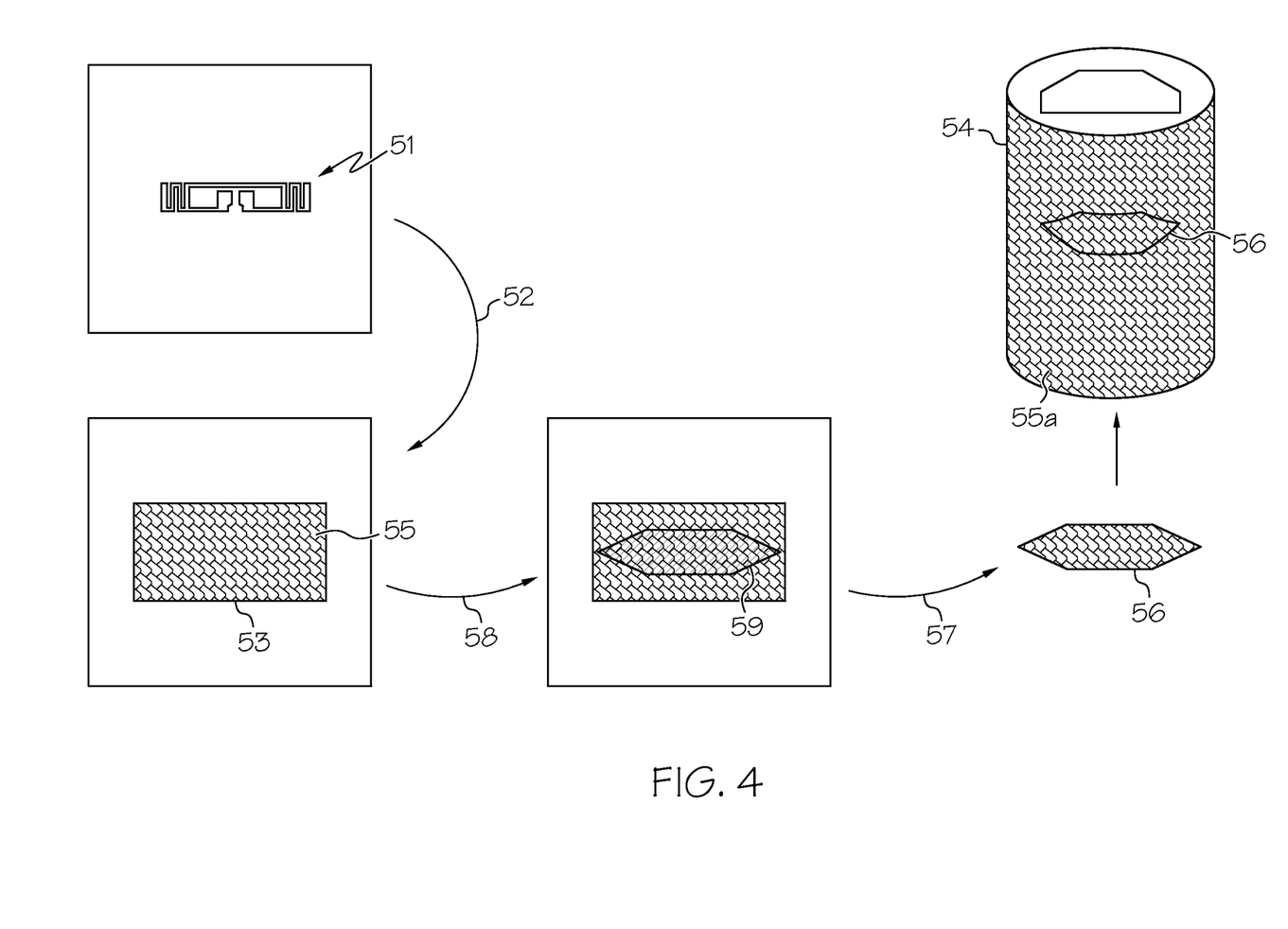
FIG. 4 is a schematic illustration along the lines of FIG. 3 including addition of a digitally defined adhesive pattern.

The embodiment illustrated in FIG. 4 begins with a printable sheet having an RFID inlay 51. By way of digital printing 52, a digitally printed pre-label 53 is prepared as generally discussed herein to include a branding pattern 55 that conforms to a branding pattern 55*a* of a merchandise item 54.

In this embodiment, a defined shape label 56 is prepared that features a digitally applied adhesive. In an illustrated embodiment, digital adhesive printing 58 applies an adhesive pattern 59 onto the digitally printed pre-label 53 to provide a pre-label 53*a* that is digitally printed with the branding pattern and color on one surface of the label substrate and with adhesive on the opposing surface of the substrate of pre-label 53*a*.

The extent of adhesive application and relative area sizing between the adhesive-covered substrate and substrate areas without adhesive permit the formation of so-called dry tabs. This pre-label 53*a* shown in FIG. 4 is subjected to the digital label cut so the defined-shape label 56 is ready for adhesion to the merchandise item 54. When a dry tab is desired, this digital cutting is done to accommodate or form dry tab areas as desired. In doing so, the printed portion of the label in progress and the completed label originally create and provide a "dry inlay", and application of the adhesive can be considered to provide a so-called "wet inlay" positioned to allow for formation of dry tabs, such as in the form of non-adhered edges, corners, perimeters, or other shapes or areas. For purposes of illustration of placement of the label, and as noted previously, the outline of the defined shape label 56 is depicted on the merchandise item 54 for purposes of illustration, it being appreciated that the objective is to have the interface that is between the defined-shaped label 56 and the area of the packaging or merchandise item 54 that surrounds label 56 after application to the merchandise item be not visible to the unaided eye.

Figure 5:
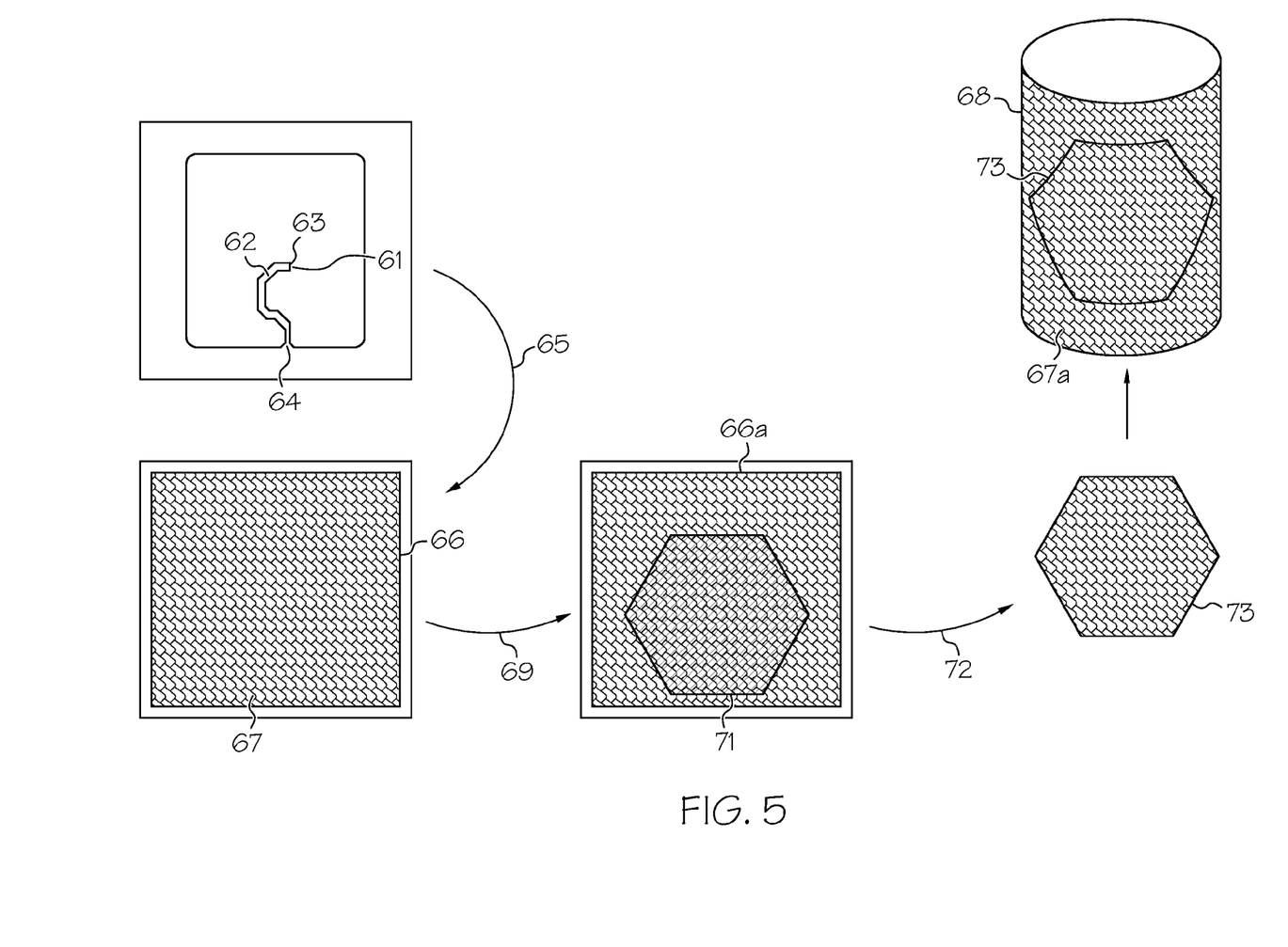
FIG. 5 is a schematic illustration of a full digital approach including a sloop-type antenna with digital adhesive printing and digitally defined cutting.

A printable sheet is shown in FIG. 5 with a so-called "sloop" type RFID inlay 61. This antenna component takes the form of a hybrid loop-slot antenna or slot-loop hybrid antenna, at times referred to as a "sloop" antenna. A variation is a hybrid loop-aperture antenna. Configurations of these types of hybrid or sloop antennas are shown in U.S. Pat. No. 7,298,343 and U.S. Pat. No. 8,072,334, incorporated herein by reference in their entirety. It will be appreciated that the slot configurations shown therein may be used as aperture configurations for a conductive sheet The RFID arrangement of FIG. 5 includes an antenna that is of the hybrid loop-slot antenna type, generally referred to as a "sloop" antenna. The illustrated RFID device has a slot 62 that is located within a conductor sheet made of electrically conductive material. This is to be as thin as possible and may be conductive foil for example. As illustrated, slot 62 has a closed end 63 within the conductor sheet, with the exception that slot has an open end 64 that is neither closed by nor short-circuited with respect to the conductor sheet. Slot 62 can be cut from the sheet of conductive material of the conductor sheet at various locations such as shown. A wireless RFID chip can be electrically coupled to the conductor sheet.

Digital printing 65 prepares a pre-label 66 having a branding pattern 67 and color that mimics branding pattern 67*a* and color of the packaging or merchandise item 68. Digital adhesive printing 69 results in preparation of digitally printed pre-label 66*a* containing a printed adhesive pattern 71. In the illustrated embodiment, the pre-label 66*a* features the branding pattern and color 67 on one side of the label and the printed adhesive pattern on the opposing face of the label. Digital cutting 72 results in defined-shape label 73. Same is shown assembled onto the merchandise item 68, which is properly positioned so as to be unobtrusive to the branding scheme and objectives of the merchandise item.

In keeping with the present disclosure, the label and the circuitry and the like provided thereby does not interfere with or otherwise negatively impact the visual attributes of the merchandise item or the related packaging. The all-digital approach allows for enhanced ease of tailoring the RFID labels to meet a particular marketing or branding theme in preparing a batch of labels that can be of relatively low volume at a cost-effective outlay for specialty manufactures as well as mass market retailers. This allows visual aesthetics of small merchandise items or containers to be supplemented with RFID capabilities that match those aesthetics or features. This achieves an important advantage for merchandise items and packaging in respect of which appearance and branding are critical.

The printer-based approaches described herein allow for the option of digitally printed adhesive. This facilitates easy integration of a feature such as a "dry tab" addition to the label. Digital variable printing aspects are useful in achieving important objectives of the present disclosure. Digitally printed adhesives allows for the selective application of adhesive in discrete areas of the label such that the entire area of the does not need to be coated with adhesive.

In a further embodiment, the digital printing concept for the label is extended to include the pattern of conductive material used for the RFID antenna. This allows the cost effective customization of the antenna design to optimize performance on the product as well as minimizing the visual impact in the ways previously described. For example, the existing conductive pattern used to form the antenna may be digitally supplemented by printing conductive material such as silver ink so that the antenna can be adapted to meet particular tuning and end use applications.

Other embodiments, besides those illustrated herein, may also be employed without departing from the scope of the present disclosure. For example, the label can be useful to reduce the visual impact of an RFID tag placed onto a pre-printed carton or other form of packaging. Visual impact reduction can include making the maximum area of the inlay transparent, such as by using a clear base material and, as far as possible, a clear adhesive. Other options include pre-printing with colored ink an area where a conductor is to be placed and which matches the general color of the packaging, same being accomplished before printing conductive silver ink on the similarly colored area. Further options include color matching face stock and providing an ink with embedded optical elements such as tiny glass spheres, or by incorporating a film base with an optical structure formed by micro-replication, which transfers the image of the surface underneath with magnification to the top surface obscuring the view of conductive ink.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A label for an item of merchandise, comprising:
   an RFID inlay placed on a label substrate;
   a digitally defined and applied pattern and/or color printed indicia area on the label substrate;
   the digitally defined and applied pattern and/or color indicia area matches a branding pattern and/or color of an item of merchandise at a label placement location of the item of merchandise, the match being unobtrusive to the visual aesthetics of the item of merchandise; and
   when the label is applied to the item of merchandise, design details of the label pattern are adjacent to and substantially in alignment with like design details of the item of merchandise pattern, whereby the label mimics the pattern of the item of merchandise.

2. The label in accordance with claim 1, wherein the label indicia area includes UV ink deposits printed at designated locations on the label substrate.

3. The label in accordance with claim 1, wherein the RFID inlay is printed onto the label substrate.

4. The label in accordance with claim 1, wherein the label is digitally cut to a predetermined perimeter size and shape that facilitates the label having a site indicia area that matches the merchandise item at the label placement location.

5. The label in accordance with claim 1, wherein the label substrate further includes a digitally printed adhesive on a surface of the label substrate opposite the substrate surface on which the indicia area is digitally printed onto the label substrate.

6. The label in accordance with claim 4, wherein the label substrate further includes a digitally printed adhesive on a surface of the label substrate opposite the substrate surface on which the indicia area is digitally printed onto the label substrate, and wherein the adhesive is printed in a pattern substantially coincident with said digitally cut predetermined perimeter.

7. The label in accordance with claim 4, wherein the label substrate further includes a digitally printed adhesive on a surface of the label substrate opposite the substrate surface on which the indicia area is digitally printed onto the label substrate, and wherein the adhesive is printed in a pattern having a surface area that is less than the digitally printed indicia area, whereby a dry tab area is provided.

8. The label in accordance with claim 1, wherein the RFID inlay includes sloop-type antenna.

9. The label in accordance with claim 1, wherein digital technology used during label production includes digital variable printing.

10. An RFID-labeled item of merchandise, comprising:
    an item of merchandise having a label placement location displaying a particular branding pattern and/or color therein; and
    a label comprising an RFID inlay on a label substrate, a digitally defined and applied pattern and/or color printed indicia area on the label substrate that matches the particular branding pattern and/or color at the label placement location at which the label is affixed such that the indicia area includes UV ink deposits printed at designated locations on the label substrate.

11. The item of merchandise in accordance with claim 10, wherein design details of the label pattern, when the label is applied to the item of merchandise, are adjacent to and substantially in alignment with like design details of the item of merchandise particular branding pattern, whereby the label mimics the pattern of the item of merchandise.

12. The item of merchandise in accordance with claim 10, wherein the RFID inlay is printed onto the label substrate.

13. The item of merchandise in accordance with claim 10, wherein the label is digitally cut to a predetermined perimeter size and shape that facilitates site indicia area that matches the merchandise item at the label placement location.

14. The item of merchandise in accordance with claim 10, wherein the label substrate further includes a digitally printed adhesive on a surface of the label substrate opposite the substrate surface on which the indicia area is digitally printed onto the label substrate.

15. The item of merchandise in accordance with claim 13, wherein the label substrate further includes a digitally printed adhesive on a surface of the label substrate opposite the substrate surface on which the indicia area is digitally printed onto the label substrate, and wherein the adhesive is printed in a pattern substantially coincident with said digitally cut predetermined perimeter.

16. The item of merchandise in accordance with claim 10, wherein the label substrate further includes a digitally printed adhesive on a surface of the label substrate opposite the substrate surface on which the indicia area is digitally printed onto the label substrate, and wherein the adhesive is printed in a pattern having a surface area that is less than the digitally printed indicia area, whereby a dry tab area is provided.

17. The item of merchandise in accordance with claim 10, wherein the RFID inlay includes sloop-type antenna.

18. A method for RFID labeling an item of merchandise, comprising:
    providing an item of merchandise, the item displaying a branding pattern and/or color at a label placement location of the item;
    providing a label having an RFID inlay;
    digitally printing on the label a pattern and/or color indicia area matching said branding pattern and/or color; and
    applying the printed label with RFID inlay to the label placement location, whereby the label is generally undetectable to the unaided eye on the item merchandise and when the label is applied to the item of merchandise, design details of the label pattern/and or color indicia area are adjacent to and substantially in alignment with like design details of the item of merchandise pattern, whereby the label mimics the pattern and/or color of the item of merchandise.

19. The method in accordance with claim 18, wherein the label at the label placement location on the item is not easily discernible to the unaided eye, wherein the label displays an appearance that is unobtrusive to the visual aesthetics of the item.

20. The method in accordance with claim 18, wherein the label blends with the displayed pattern and/or color of the merchandise, whereby the label has an unobtrusive appearance on the item of merchandise.

* * * * *